United States Patent [19]

Gami et al.

[11] Patent Number: 5,161,073

[45] Date of Patent: Nov. 3, 1992

[54] LOW POWER DISK DRIVE SPINDLE MOTOR CONTROLLER

[75] Inventors: Bipin V. Gami, Northridge; Russell H. Jacobs, Thousand Oaks, both of Calif.

[73] Assignee: Micropolis Corporation, Chatsworth, Calif.

[21] Appl. No.: 556,575

[22] Filed: Jul. 20, 1990

[51] Int. Cl.[5] .................. G11B 19/28; G11B 19/00
[52] U.S. Cl. .................... 360/73.03; 360/71
[58] Field of Search ............ 360/73.01, 73.03, 72.1, 360/71, 69, 99.08; 318/599, 254 R, 254, 139, 560, 561

[56] References Cited

U.S. PATENT DOCUMENTS

| | | | |
|---|---|---|---|
| 4,786,995 | 11/1988 | Stupeck et al. | 360/75 |
| 4,831,469 | 5/1989 | Hanson et al. | 318/254 |
| 4,839,754 | 6/1989 | Gami et al. | 360/73.01 |
| 4,843,288 | 6/1989 | Volz et al. | 318/254 |

OTHER PUBLICATIONS

"Peripherals", IEEE Spectrum, Feb. 1990, pp. 28–30.

*Primary Examiner*—John H. Wolff
*Assistant Examiner*—Craig A. Renner
*Attorney, Agent, or Firm*—Poms, Smith, Lande & Rose

[57] ABSTRACT

A hard disk drive digital storage system provides increased efficiency and reduced losses by using a switching regulator type power supply in which a variable duty cycle, low resistance n-channel field effect transistor is located near the ground side of the motor drive circuit. A voltage booster circuit provides higher switching voltages to the motor power phase control switching transistors.

20 Claims, 1 Drawing Sheet 5,161,073

LOW POWER DISK DRIVE SPINDLE MOTOR CONTROLLER

FIELD OF THE INVENTION

This invention relates to high speed Winchester-type or hard disk drive storage systems.

BACKGROUND OF THE INVENTION

It has previously been proposed to use switching regulator power supplies in hard disk drives, as shown for example in U.S. Pat. No. 4,839,754, granted Jun. 13, 1989; inventors: Bipin V. Gami and Ericson Dunstan, and assigned to the assignee of this invention.

In the field of hard disk drives, the 5¼-inch disk systems have standard over-all dimensions including a height of 3.25 inches (82.6 mm), a width of 5.75 inches (146 mm), and a depth of 8.00 inches (203 mm). Environmental standards have also been established, with the operating temperature extending from 5° C. to 50° C., and the non-operating or storage temperature extending from −40° C. to +65° C.

It has been customary to operate the disk drives so that the speed of rotation of the disks is 3600 rpm, which means that the disks make one revolution in 16.67 milliseconds. For such systems, the average latency time or time to access a sector of digital data is approximately 8.33 milliseconds, or one-half the time for one revolution. Several years ago, the average time for changing tracks on a hard disk drive was about 32 milliseconds, and this has now been reduced to about 12.5 milliseconds, with improved technological developments.

Now, in order to reduce the latency time, certain hard disk drive motor speeds are being increased from 3600 rpm to 5400 rpm, thereby reducing the average time to access a sector from about 8.33 milliseconds to about 5.56 milliseconds.

With increased speed, however, the drive power requirements have increased, as the required drive power increases exponentially with increased speed. In this regard, some manufacturers have been forced to provide heat sinks or cooling fins which extend beyond the dimensional limitations for hard disk drives as set forth hereinabove.

In the motor control circuit of U.S. Pat. No. 4,839,754 the switching regulator power supply, a p-channel Field Effect Transistor (FET), was employed to convert power from the 12 volt supply level to a lower voltage to power the 3600 rpm motor, with much greater efficiency than is obtained with conventional linear power regulators. However, the p-channel FET has a resistance of about 0.3 ohms, and with the circuit parameters of a 5400 rpm hard disk drive motor, the resistance of this p-channel FET increases the circuit power dissipation to undesirably high levels.

Accordingly, a principal object of the present invention is to reduce the power requirements of the drive circuit for a hard disk drive having a high speed motor, such as the 5400 rpm motors.

SUMMARY OF THE INVENTION

In accordance with one illustrative embodiment of the invention, a switching regulator type power supply for a 5400 rpm motor has been designed with low power dissipation. The 5400 rpm motor has a torque constant of about 1.6 ounce-inches per ampere, and a resistance of about 0.45 ohms, as compared with the comparable figures of about 2.5 oz-in/amp and about 0.8 ohms for a 3600 rpm motor. With a plus 12 volt standard power supply, the switching transistor for the switching regulator is located near the ground side of the circuit, so that a low resistance n-channel field effect transistor may be employed; and the control voltage for the switching transistors supplying phased current to the motor is boosted from the 12 volt supply level to positively operate these switching transistors.

It is noted that the power to the motor may be varied by varying the duty cycle of the switching transistor in the switching regulator power supply; and the switching regulator power supply includes (1) an input filter to ensure that switching regulator current fluctuations are not reflected back into the 12-volt power supply; and (2) an output filter to smooth the pulses from the power supply switching transistor.

In accordance with a broader aspect of the invention, a switching regulator power supply for a high speed Winchester-type disk drive is located on the ground side of the power circuit and employs a low resistance n-type or n-channel transistor.

In accordance with an additional feature of the invention, the sense resistor is connected between the switching regulator and ground, and therefore measures the current being drawn from the power supply; whereas the sense resistor of the prior system of U.S. Pat. No. 4,839,754 measures only the motor current, and thus does not indicate total power drawn from the power supply, which may involve variation in switching regulator losses, with temperature, duty cycle, and other factors.

It is noted in passing that the conventional and logical location for a switching regulator type power supply is at the high voltage input to the circuit; but the present inventors have determined that the unusual location of the switching power supply at the ground side of this type of disk drive circuit, serves to significantly increase the efficiency of the circuit and reduce power losses and heating.

Other objects, features and advantages of the present invention will become apparent from a consideration of the following detailed description from the accompanying drawings.

DETAILED DESCRIPTION OF PREFERRED EMBODIMENT

Figure 1:
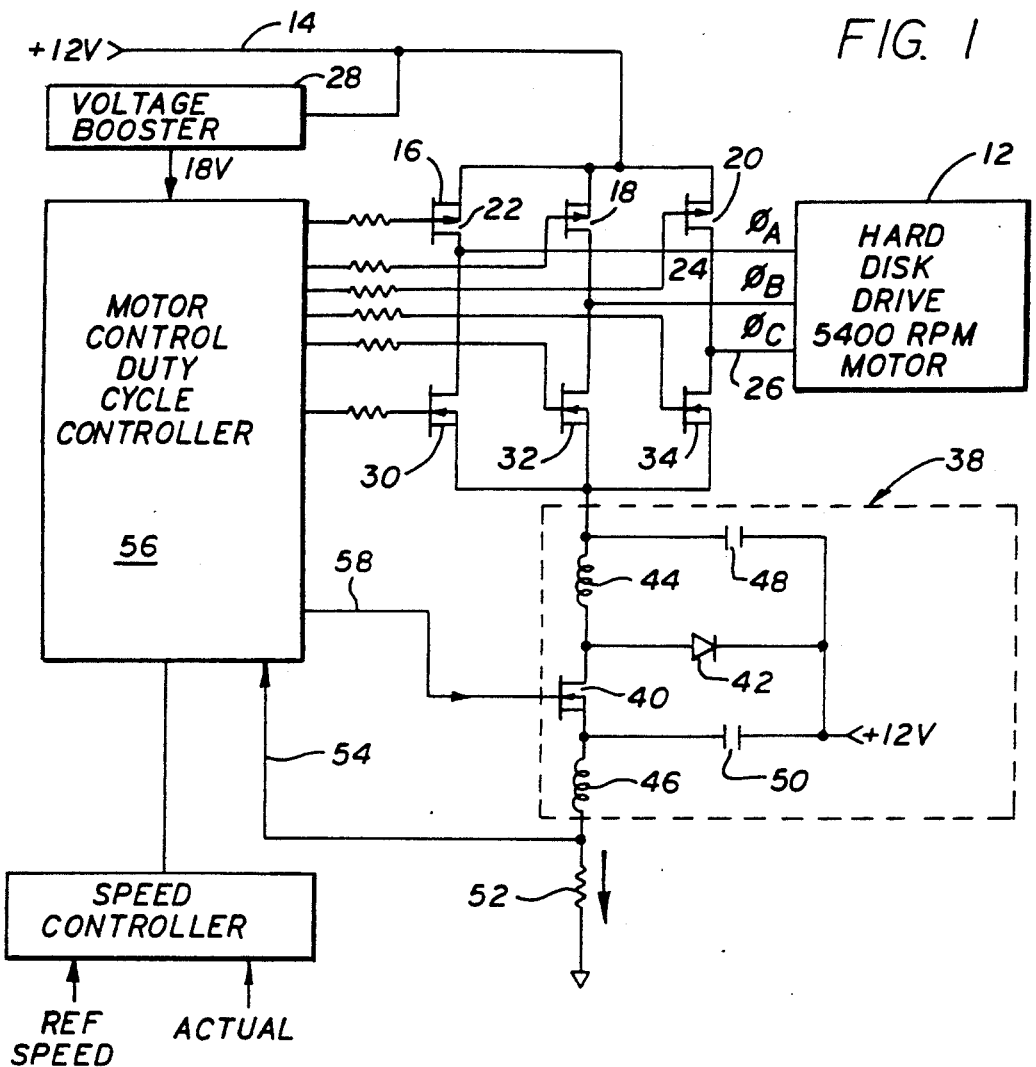
FIG. 1 is a block diagram of a hard disk drive storage system illustrating the principles of the present invention.

Referring more particularly to the drawings, FIG. 1 is a block circuit diagram of a hard disk drive system including a hard disk drive assembly 12 including a motor which rotates at 5400 rpm.

Incidentally, the motor may be of the type disclosed in U.S. Pat. No. 4,839,754, cited above, with certain significant differences, as mentioned above. However, the motor may have a permanent magnet rotor which is generally cylindrical in its configuration, and to which the storage disks are mounted. In addition, the motor may have a fixed inner stator having three phases $\phi A$, $\phi B$, and $\phi C$ which are successively energized, in a known manner, to couple with the permanent magnet rotor as the successive phases are energized. It is also noted that the drawings and text of U.S. Pat. No. 4,839,754 are hereby incorporated into the present patent application by reference, with the differences between the system as disclosed in that patent and the present invention being specifically pointed out in the present case. With regard to the motor, for example, the motor torque constant has been reduced from approximately 2.5 oz-in/amp in the 3600 rpm motor of U.S. Pat. No. 4,839,754, to approximately 1.6 oz-in/amp in the present 5400 rpm motor. In addition, the resistance has been reduced from approximately 0.8 ohms to approximately 0.45 ohms. This is accomplished principally by employing larger diameter wire in the stator windings, and correspondingly fewer turns.

Now, returning to FIG. 1 of the drawings, a standard 12-volt power input is provided on lead 14. This is coupled to three p-channel field effect transistors, 16, 18 and 20, which are connected to the motor assembly 12 by leads 22, 24 and 26, respectively. These p-channel field effect transistors are normally held in the off state by the application of a positive voltage such as 18 volts, supplied by the voltage booster 28, applied to the control gate electrodes of these field effect transistors. They are selectively and sequentially turned on, by the application of a substantial negative signal to the gate electrode, relative to the source electrode. With the source electrode at the positive 12-volt potential of the power supply lead 14, a substantially lower potential, such as ground, applied to the gate electrode of these p-channel field effect transistors, will turn them on. An additional set of three field effect transistors 30, 32 and 34, this time n-channel field effect transistors, are provided to give a return path from the motor assembly 12. Thus, for example, transistor 16 and transistor 32 may be turned on energizing one phase of the three-phase permanent magnet motor, and during the next sequential interval, these two transistors are turned off, and the next set of field effect transistors, such as transistor 18 and transistor 34, may be rendered conductive so that the next phase of the windings of the stator of the permanent magnet motor is energized. It is further noted that a positive gate-to-source potential serves to turn on the n-channel field effect transistors, 30, 32 and 34.

The switching regulator power supply circuitry 38 will now be described. It includes the n-channel field effect transistor 40, the Schottky diode 42, the two inductors 44 and 46, and the two capacitors 48 and 50. The current drawn by the motor is sensed by the voltage developed across the resistor 52, and this signal is coupled on lead 54 back to the motor control and duty cycle controller 56. Positive pulses are applied on lead 58 to the gate electrode of the switching transistor 40, at a constant frequency, which is preferably relatively high, such as 100 or 200 kHz or higher. The width of the pulses applied to the gate of field effect transistor 40 is varied to vary the amount of current supplied to the motor 12. The mode of operation of the circuit 38 is substantially the same as has been described above in U.S. Pat. No. 4,839,754. In this regard, the filter provided by the inductor 44 and the capacitor 48 prevents high frequency components arising from the switching of transistor 40 from being fed back to the power supply to lead 14. Similarly, inductor 46 and capacitor 50 provide smoothing for the output direct current pulses from the switching transistor 40.

Returning to the sense resistor 52, it may be noted that the voltage developed across it is a direct indication of the current being drawn from the 12 volt power supply. This is in contrast to the sense resistor in the circuit of U.S. Pat. No. 4,839,754 in which the current through the sense resistor is that drawn by the motor, as discussed above. The voltage developed across sense resistor 52 is supplied to control circuit 56 and is processed with other signals to control the duty cycle of transistor 40, thereby controlling the power supplied by the switching regulator power supply. For example, the total amount drawn from the 12 volt supply may not exceed 3.5 amperes, so the signal developed across the sense resistor indicates the level of current being drawn, and the control circuitry limits the duty cycle of the circuit 38 to avoid exceeding this limit.

As mentioned above, the n-channel field effect transistor 40 has significantly lower resistance when it is turned on than the corresponding p-channel field effect transistor which was employed in the switching power regulator circuit of U.S. Pat. No. 4,839,754. Accordingly, the heat dissipation and power losses in the variable duty cycle switching transistor are significantly reduced, as compared with the circuit of U.S. Pat. No. 4,839,754.

Figure 2:
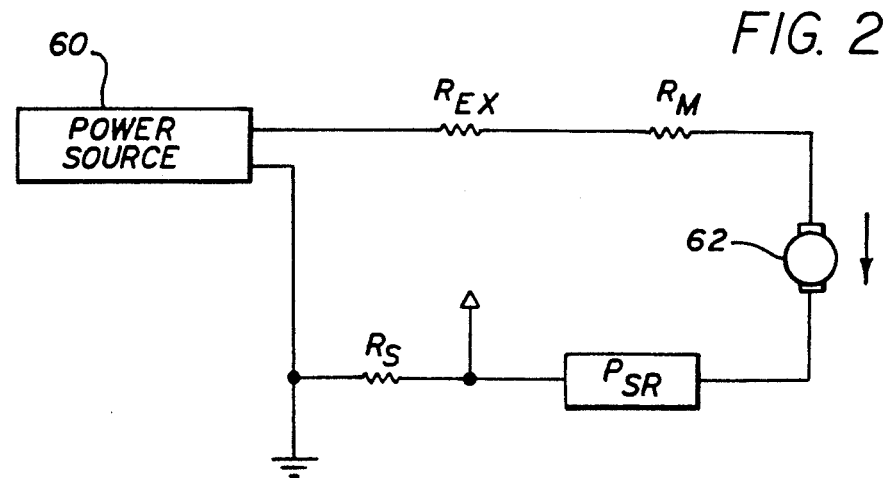
FIG. 2 is a simplified circuit diagram employed in the analysis of systems of the present type.

Attention will now be directed to FIG. 2 in which the power source 60 supplies power to the motor 62, with $R_M$ representing the resistance of the motor, $R_S$ representing the resistance of the sense resistor, and $R_{EX}$ representing the other external resistance. $P_{SR}$ represents the power dissipated in the switching regulator. The power source has a standard voltage $V_T$ of 12 volts, as mentioned above, and the maximum total current $I_T$ available for driving the motor is 3.5 amperes $I_M$ represents the current flowing through resistor $R_M$. Accordingly:

(1) $Available\ Power = V_T \times I_T = 12 \times 3.5 = 42$ watts (2) $42 - P_{SR} = I^2_M(R_{EX} + R_M R_S)$ If the switching regulator is ideal, the $P_{SR}$ of the switching regulator is equal to 0.

Then:

(3) $Power = I^2 R$ (4) $I^2_M = 42/-$
$(R_{EX} + R_M + R_S) = 42/(0.48 + 0.45 + 0.1) = \qquad 40.78$ (5) $I_M = \sqrt{40.78} = 6.39$ amps For the p-channel FET with a resistance of about 0.3 ohms, the power dissipation is approximately as follows, using equation (3):

(6) $P = 6.39^2 \times 0.3 = 12.25$ watts

For the n-channel FET with a resistance of only 0.1 ohms, the power dissipation is approximately as follows:

(7) $P = 6.39^2 \times 0.1 = 4.08$

Thus, as compared with the total available power of 42 watts, using a p-channel field effect transistor, the power dissipated in the transistor is about 12.25 watts, or nearly 30% of the power. On the other hand, using the circuit of the present invention, permitting the use of an n-channel FET, the power dissipated in the transistor would be less than 10%, thus permitting the application of significantly more power to drive the motor.

While the foregoing calculations are fairly rough, and use simplifying assumptions, it is clear that there is a very significant increase in efficiency obtained by the use of the circuitry of the present invention.

In conclusion, it is to be understood that the foregoing detailed description and the accompanying drawings relate to one illustrative embodiment of the invention. Various changes and modifications may be made without departing from the spirit and scope thereof.

Thus, by way of example and not of limitation, alternative high speed n-type transistors may be employed in place of transistor 40, different filter circuits may be employed in circuit 38 to accomplish the same function, other types of high speed motors may be employed instead of the 5400 rpm motor described hereinabove, and the principles of this invention are applicable to hard disk drives, both magnetic and optical, and having other than the 5¼-inch disk drive size. It is also noted that the duty cycle may be varied by using substantially constant width pulses with varying "off" time, thus changing the very high frequency of the cycle, instead of changing the pulse width at a constant frequency. Accordingly, the present invention is not limited to the specific arrangements as shown in the drawings and as described in detail hereinabove.

We claim:

1. A high efficiency, switching regulator type hard disk storage system comprising:
    a hard disk drive assembly including storage disks and a permanent magnet motor having a multiple phase stator;
    switching circuit means electrically connecting a power source and each phase of said multiple phase stator for electrically connecting electrical power to said multiple phase stator;
    a switching regulator circuit including an n-channel field effect switching transistor connected between said switching circuit means and ground; and
    means for applying substantially constant high frequency pulse switching signals to said n-channel field effect switching transistor, said pulse switching signals providing a varying duty cycle to vary the power supplied from said power source to said multiple phase stator of said motor.

2. A hard disk storage system as defined in claim 1 wherein means are provided for applying said high frequency pulse switching signals to said n-channel field effect switching transistor at a frequency above 60 Hz.

3. A hard disk storage system as defined in claim 1 further including filter means for smoothing the high frequency pulse switching signals passed by said n-channel field effect switching transistor and for preventing significant high frequency noise to be reflected back into the power source.

4. A hard disk storage system as defined in claim 1 wherein a sense resistor is connected between said switching regulator circuit and ground, a voltage developing across said sense resistor during operation of said permanent magnet motor and wherein circuit means are provided for employing the voltage developed across said sense resistor to control said switching circuit means, thereby regulating the power supplied to said multiple phase stator by said switching circuit means.

5. A hard disk storage system as defined in claim 1 wherein said switching circuit means includes a plurality of field effect transistors.

6. A hard disk storage system as defined in claim 5 in which some of said plurality of field effect transistors are n-channel field effect transistors and are controlled by applying a gate voltage greater than an applied source or drain voltage applied to said n-channel field effect transistors.

7. A high efficiency, switching regulator type hard disk storage system comprising:
    a hard disk drive assembly including storage disks and a motor having multiple phase windings;
    switching circuit means connected to a positive power source and to each of said multiple phase windings for supplying electrical power to said multiple phase windings;
    a switching regulator circuit including a high speed n-type transistor connected between said switching circuit means and ground; and
    means for applying high frequency pulse switching signals to said high speed n-type transistor, said pulse switching signals providing a varying duty cycle to vary the power supplied from said power source to said motor.

8. A hard disk storage system as defined in claim 7 wherein means are provided for applying said high frequency pulse switching signals to said n-type transistor at a frequency above 60 Hz.

9. A hard disk storage system as defined in claim 7 further including filter means for smoothing the high frequency pulse switching signals passed by said n-type transistor and for preventing significant high frequency noise to be reflected back into the power source.

10. A hard disk storage system as defined in claim 7 wherein said n-type transistor is an n-channel field effect transistor.

11. A hard disk storage system as defined in claim 6 wherein a sense resistor is connected between said switching regulator circuit and ground, a voltage developing across said sense resistor during operation of said motor and wherein circuit means are provided for employing the voltage developed across said sense resistor to control said switching circuit means, thereby regulating the power supplied to said multiple phase windings by said switching circuit means.

12. A hard disk storage system as defined in claim 7 wherein said switching circuit means includes a plurality of field effect transistors.

13. A hard disk storage system as defined in claim 12 in which some of said plurality of field effect transistors are n-channel field effect transistors and are controlled by applying a gate voltage greater than an applied source or drain voltage applied to said n-channel field effect transistors.

14. A high efficiency, switching regulator type hard disk storage system comprising:
    a hard disk drive assembly including storage disks and a motor having multiple phase windings;
    a positive power source for providing electrical power to said motor;
    a switching circuit means connected to a positive power source and to each of said multiple phase windings for supplying electrical power to said multiple phase windings;
    a switching regulator circuit including a high speed, low "on " resistance transistor connected between said switching circuit means and ground;
    means for applying high frequency pulse switching signals to said high speed, low "on" resistance transistor, said pulse switching signals providing a varying duty cycle to vary the power supplied from said power source to said motor;

a sense resistor connected between said switching regulator circuit and ground, a voltage developing across said sense resistor during operation of said motor; and means for utilizing the voltage developed across said sense resistor to control said switching circuit means.

15. A hard disk storage system as defined in claim 14 wherein means are provided for applying said high frequency pulse switching means pulse signals to said high speed, low "on" resistance transistor at a frequency above 80 kHz.

16. A hard disk storage system as defined in claim 14 further including filter means for smoothing the high frequency pulse switching signals passed by said high speed, low "on" resistance transistor and for preventing significant high frequency noise to be reflected back into the power source.

17. A hard disk storage system as defined in claim 14 wherein said high speed, low "on" resistance transistor is an n-channel field effect transistor.

18. A hard disk storage system as defined in claim 17 wherein said switching circuit means includes a plurality of field effect transistors.

19. A hard disk storage system as defined in claim 18 in which some of said plurality of field effect transistors are n-channel field effect transistors and are controlled by applying a gate voltage greater than an applied source or drain voltage applied to said n-channel field effect transistors.

20. A high efficiency, switching regular type hard disk storage system comprising:

a hard disk drive assembly including storage disks and a motor having multiple phase windings;

switching circuit means connected to a positive power source and to each of said multiple phase windings for supplying electrical power to said multiple phase windings;

a switching regulator power convertor including a high speed n-type transistor connected between said switching circuit means and ground; and means for applying high frequency pulse switching signals to said high speed n-type transistor to vary the power supplied from said power source to said motor.

* * * * *